May 7, 1963 T. O. MATHUES ETAL 3,088,539
VEHICLE INSTRUMENT AND DASHBOARD ASSEMBLIES
Original Filed Sept. 9, 1959 4 Sheets-Sheet 1
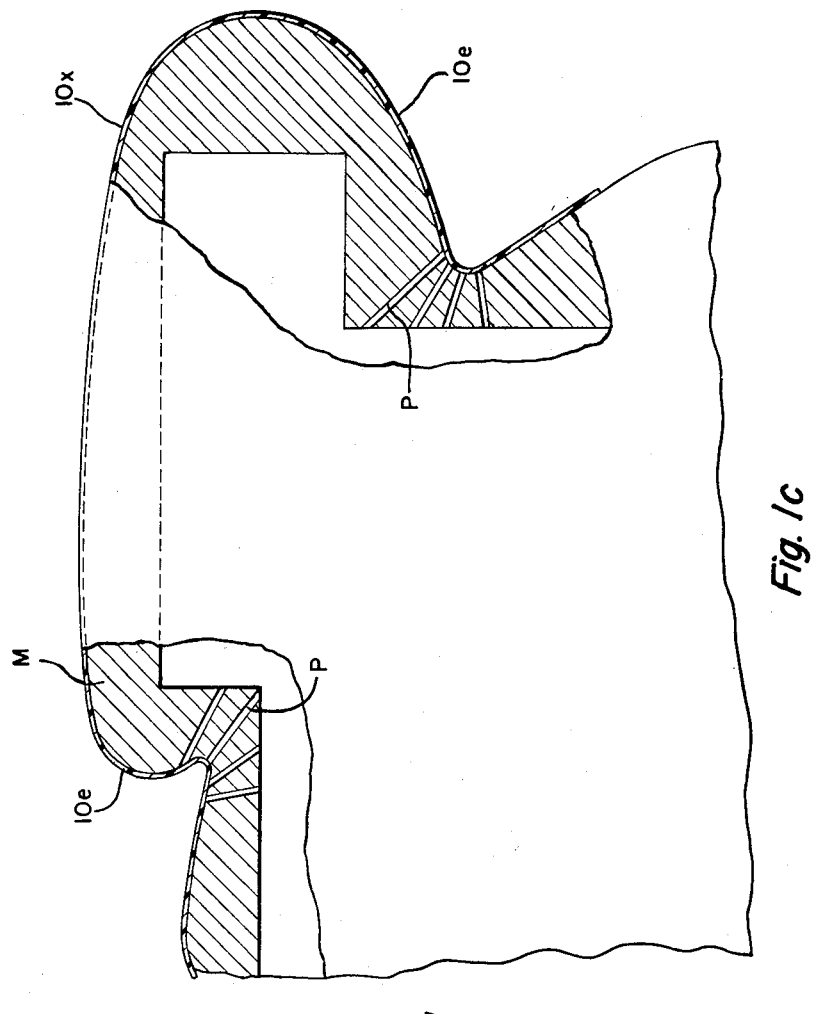
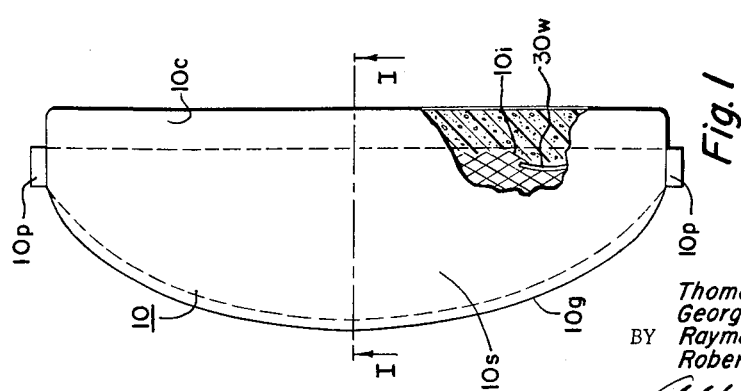
INVENTORS.
Thomas O. Mathues
George W. Beck
BY Raymond C. Davis
Robert W. Forward
Albert H. Reuthe
Their Attorney

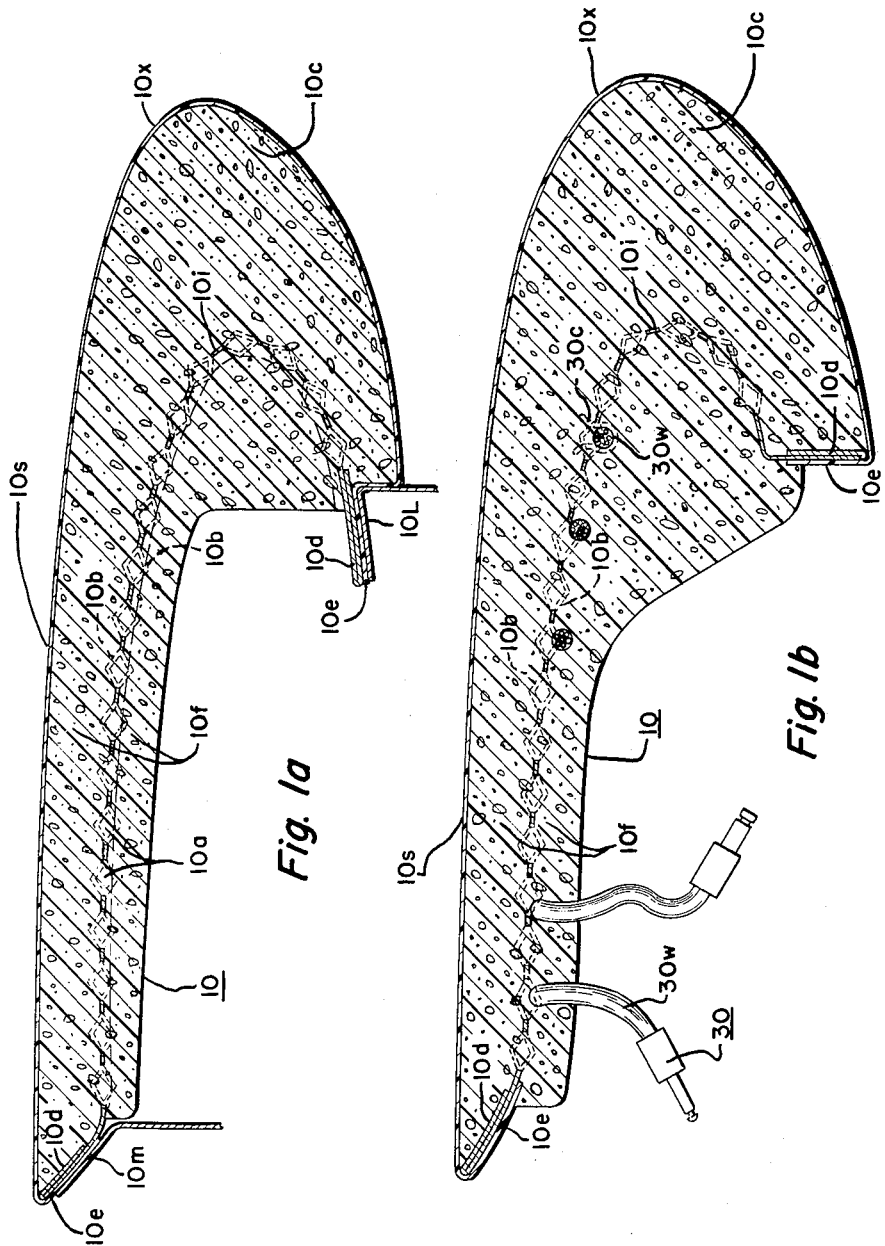

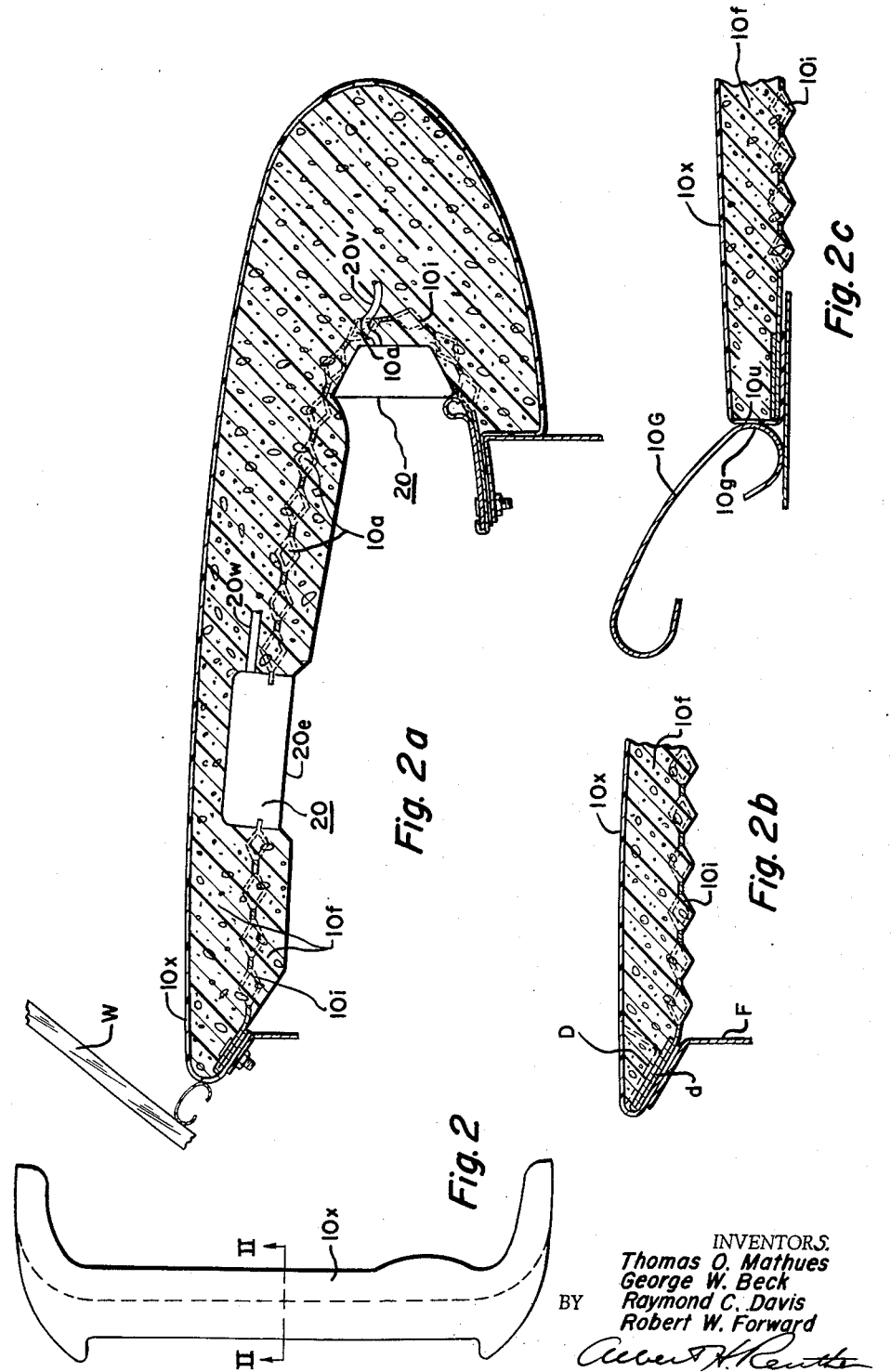

May 7, 1963 T. O. MATHUES ETAL 3,088,539
VEHICLE INSTRUMENT AND DASHBOARD ASSEMBLIES
Original Filed Sept. 9, 1959 4 Sheets-Sheet 4

INVENTORS.
Thomas O. Mathues
George W. Beck
Raymond C. Davis
Robert W. Forward
BY
Their Attorney

United States Patent Office 3,088,539
Patented May 7, 1963

---

3,088,539
VEHICLE INSTRUMENT AND DASHBOARD ASSEMBLIES
Thomas O. Mathues, George W. Beck, Raymond C. Davis, and Robert W. Forward, Dayton, Ohio, assignors to General Motors Corporation, Detroit, Mich., a corporation of Delaware
Original application Sept. 9, 1959, Ser. No. 838,944, now Patent No. 3,042,137, dated July 3, 1962. Divided and this application Nov. 18, 1960, Ser. No. 70,239
7 Claims. (Cl. 180—90)

This invention relates to dashboard structures and particularly a method and means for forming a crashpad type of dashboard panel with and without electrical circuit means therewith.

This is a division of copending parent application Serial Number 838,944—Mathues et al., filed September 9, 1959, now Patent 3,042,137, issued July 3, 1962.

An object of this invention is to provide a new and improved dashboard assembly using foam material relative to insert means adapted to enhance potential safety value thereof.

Another object of this invention is to provide a relatively compressible protective device for vehicle interiors including an expanded and/or apertured insert means molded integrally in a unit with a skin foam whereby there is realized a reduction in total weight of insert, foam, and skin assembly and whereby increased rigidity is obtained in addition to filling of space fully with one or more foam materials.

A further object of this invention is to provide a method and means of forming completely to shape a protective device for vehicle interiors including use of an insert relative to which an outer cover is provided and adapted to be positioned in a shape maintained in a mold by means of differential pressure so that foam can be supplied and cured into place relative to the insert and cover requiring a minimum, if any, of post forming after the molding operation.

Another object of this invention is to provide a vehicle dashboard structure including an insert means relative to which a partial or complete wiring circuit such as a wiring harness and/or printed circuit is secured prior to filling foam relative thereto into a contoured shape and thereby eliminating loose wiring under a vehicle dashboard and incorporating electrical connectors for connections between electrical components such as an instrument cluster or wiring harness trunk outlet on an adjacent portion of a vehicle body and thereby resulting in a pre-tested ready to install complete dashboard and affording advantages such as freedom from wire chafing and resultant electrical fires, freedom from hard to find rattles, lower overall cost, greatly simplified instrument mounting and connecting to electrical circuitry as well as possible shock mounting for instruments.

A further object of this invention is to provide a nonmetallic dash panel for vehicles and adapted to be capable of collapsing under severe impact without causing undue forces on a human body or breaking in such a way that puncture wounds could be inflicted because an integral foam pad and insert are made reasonably soft and crushable of electrical insulating and non-conducting materials.

Another object of this invention is to provide an instrument panel cover assembly utilizing a skin fastened in place relative to and insert perforated to permit flow of resilient foam material on opposite sides of the insert adapted to provide a flange formed completely to shape along an edge thereof for mounting relative to a vehicle body with and without a garnish molding or trim member.

Further objects and advantages of the present invention will be apparent from the following description, reference behind had to the accompanying drawings wherein preferred embodiments of the present invention are clearly shown.

In the drawings:

FIGURE 1 is a plan view of a dashboard structure in accordance with the present invention.

FIGURE 1a is a cross-sectional elevational view taken along line I—I of FIGURE 1 and representing one embodiment of the present invention.

FIGURE 1b also is a cross-sectional elevational view taken along line I—I of FIGURE 1 and representing another embodiment of the invention.

FIGURE 1c is a cross-sectional elevational view outlining diagrammatically a differential-pressure forming mold for use in a method and means of forming completely to shape a protective device for vehicle interiors in accordance with the present invention.

FIGURE 2 is a plan view of another dashboard structure in accordance with the present invention.

FIGURE 2a is a cross-sectional elevational view taken along line II—II of FIGURE 2 and representing a modification of structure of FIGURE 1b.

Figure 2D:
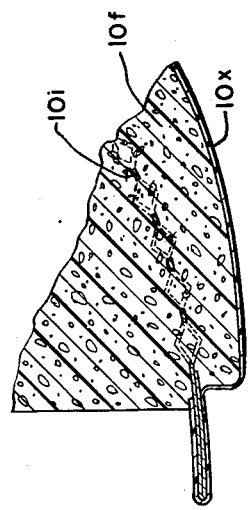

FIGURES 2b, 2c, 2d, and 2e are fragmentary cross-sectional elevational views showing modifications of structure usable with structures of FIGURES 1a, 1b, and 2a.

Figure 3:
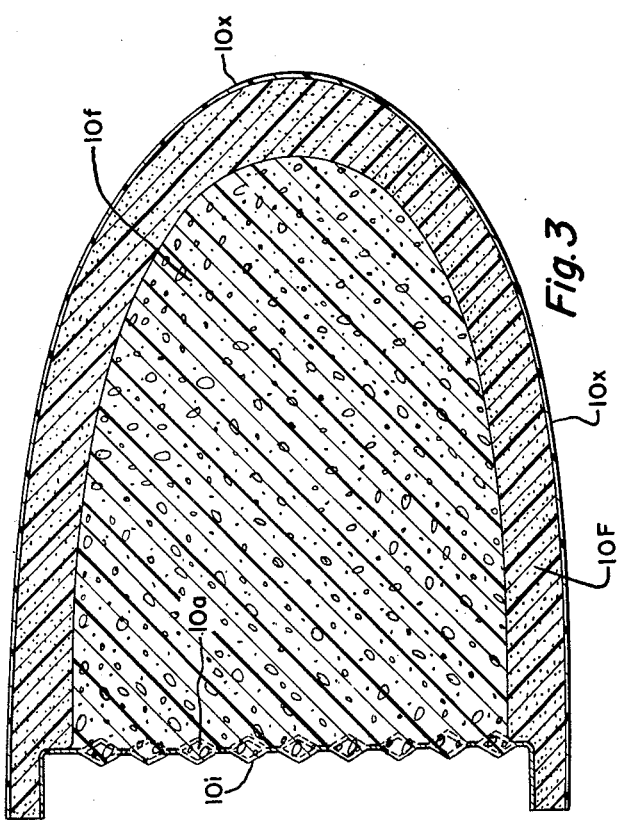

FIGURE 3 is a cross-sectional elevational view illustrating multiple density or multiple layers of foam on a dashboard panel.

Figure 3A:
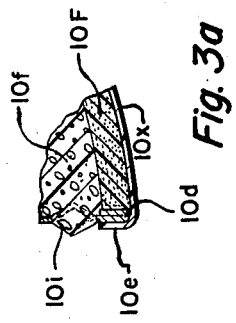

FIGURE 3a represents a modification of one portion of structure shown in FIGURE 3.

FIGURE 1 shows a top view of a dashboard structure or instrument-panel generally indicated by numeral 10 and including a shelf portion 10s as well as a laterally projecting curved cushion portion 10c. The cushion portion 10c extends laterally from edge to edge where flanges for side projection 10p of an insert means 10i can be provided for permitting fastening or mounting of the dashboard structure relative to a vehicle body. A garnish or trim molding portion 10g is provided having a curved contour corresponding substantially to a curved base of a windshield in a usual manner.

As better seen in FIGURES 1a and 1b, the insert means 10i is preferably formed of a piece of sheet metal provided with open meshes or lattice work. The insert 10i can be constructed by slitting a metal sheet and then opening the slits into meshes by a separate operation of pulling or stretching or expanding the sheet metal by a bending operation so as to deform the bars connecting the slit portions and body of the sheet. Individual bars 10b of the insert 10i can be bent in opposite directions relative to each other as best seen in FIGURES 1a and 1b. The crashpad type of dashboard panel in accordance with the present invention also includes a covering or external sheet 10x of flexible material having an attractive color and corresponding or being complementary to the interior decoration of a vehicle. This covering can be made of leather, imitation leather, or leather-like composition of flexible skin material having a composition including vinyl resin and/or styrene acrylonitrile resin which is resistant to distortion and deformation due to high temperatures and heat such as from rays of the sun which can shine through a windshield of glass adjacent to the dashboard. The covering includes an inwardly extending edge portion 10e adapted to be fitted to or sandwiched between a folded or doubled over portion 10d along laterally spaced edges of the insert means 10i. The edge 10e closest to the windshield of glass can be fitted between this doubled over portion 10d and a flange of attaching metal 10m which can be part of or attached to a fire wall of a motor vehicle. An L-shaped attaching portion 10L can be provided in a position spaced laterally to one side and substantially below the flange of attaching metal 10m such that the crashpad of the dashboard has a structure including the upper platform portion 10s and the curved portion 10c referred to with FIGURE 1. FIGURES 1a and 1b illustrate how foam material 10f is filled into space on opposite sides of the insert means 10i. Apertures 10a are provided by the expanded metal of the insert means and foam material that rises evenly is filled into at least a part of the space defined by the shape of the covering material 10x. Any foam material that has insulating properties can be used. For example, foam rubber or latex which is readily flowable can be filled into a cavity and excess latex can be scraped away using a knife. However, in accordance with the present invention, the crashpad is adapted to be free of any voids or irregularities in the distribution of foam material relative to the expanded metal insert means 10i and covering material 10x. Thus, no tools such as a knife can ever be used to place or force foamed material such as latex relative to a perforated sheet backing.

Preferably, in accordance with the present invention, an isocyanate base insulation material is provided and caused to foam in space relative to the covering material 10x and expanded material insert means 10i. Elastomeric foam materials which are particularly useful for the purpose of the present invention are the polyurethane foams having varying desired densities. These foams may be formed by reacting a wide variety of polymeric materials such as polyesters, polyesteramides, polyaklylene glycol, castor oil and other materials having a plurality of reactive hydrogen groups with organic polyisocyanates, in the presence of accelerators and/or cross linking agents and/or other addition agents such as plasticizers for modifying the characteristics of the foam. The formation of foamed polyurethane plastics involves a series of complex, physical and chemical reactions in which the evolution of carbon dioxide gas resulting from a reaction of carboxyl and isocyanate groups and/or between water and isocyanate groups causes the foamed or cellular character of these plastics.

Examples of suitable polymeric materials which may be used in the production of suitable foams for use in the present invention are polyesters, and polyesteramides such as may be obtained by condensing a variety of polybasic acids, preferably dibasic acids such as adipic, sebacic, phthalic, oxalic, malonic, succinic, maleic, fumaric, itaconic, etc., with polyalcohols such as ethylene glycol, diethylene glycol, glycerol, sorbitol and/or amino alcohols such as ethanolamine and amino propanol. Alkylene glycols and polyoxyalkylene glycols which may be used include ethylene glycol, propylene glycol, styrene glycol, diethylene glycol and polypropylene glycol and copolymers of these glycols. A high grade castor oil may also be used.

Examples of suitable organic polyisocyanates which maybe used include aromatic isocyanates such as toluene 2,4 diisocyanate, toluene 2,6 diisocyanate and mixtures thereof, naphthalene 1,5 diisocyanate and m-phenylene diisocyanate, etc., and mixtures of these materials.

Examples of components which may be used for promoting the poly-addition reaction between the above mentioned polymeric materials having free hydrogen reactive groups and organic polyisocyanates, and providing essential acceleration of the reaction include ethyl ethanolamine, diethyl ethanolamine, tyridine, hexahydro dimethylaniline, methyl piperazine, dimethyl piperazine, tribenzyl amine, N-morpholine, N-methyl morpholine, and N-ethyl morpholine. The relative hardness of the polyurethane foam can be varied by a suitable selection in suitable proportion of the initial foam forming ingredients.

It is apparent that properties of a finished foam material are dependent upon many factors. As foaming occurs, bubbles increase in size, additional bubbles are formed, and some bubbles are lost due to coalescence. Concurrently, the polymerization reaction effects an increase in viscosity and raises the temperature until finally gel point is reached and approached such that viscosity becomes very high and increases rapidly to be followed by the polymer becoming strong enough to support itself. Foams are recognized as being thermodynamically unstable such that there is an inherent tendency toward collapse. Surface tension affects foam stability and therefore foam stabilizers which are surface active materials are provided to cause appreciable surface-tension lowering so as to lessen the thermodynamic force toward collapse. Silicones are commonly used as additives in polyurethane foaming operations. Surface-active additives such as typical silicones, polydimethylsiloxanes have appreciable effect on surface-tension during preparation of polyurethane foams. The foaming operation is complete in a matter of minutes and therefore an effective additive must lower surface-tension sufficiently and must do so quickly. Contraction and shrinkage of resilient and rigid polyurethane foams can be averted frequently by careful control of prepolymer preparation and suitable adjustments of the foam recipe. Since an isocyanate-water reaction is strongly exothermic and causes a temperature rise during foaming, there can be some shrinkage or contraction as the foam cools back to room temperature when the gas contained therein contracts. However, major shrinkage will not occur if the curing reaction is very rapid compared to the rate of gas permeation and the polymer has become mechanically strong enough before sufficient vacuum is built up to distort the foam permanently. Also, if the foam structure opens up before enough pressure differential builds up, no skrinkage occurs.

Figure 2E:
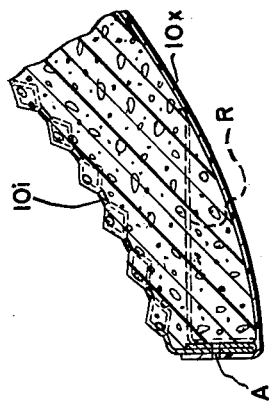

Preferably in accordance with the present invention, the foam material serves as a filler relative to the covering 10x which is sheet material. This sheet material can be obtained commercially in various colors and sizes. Various types of plastic sheet material can be used and preferably the covering 10x is vacuum formed as a rubber resin copolymer skin to a shape along its edges that will permit it to be cemented in place on an insert such as 10i without further postforming after the molding operation. This is illustrated specifically where an insert is molded as a part of the cover and foam assembly as illustrated in views of FIGURES 1c, 2d and 2e. Previously no such cover or skin has been formed completely to shape a flange around an insert so as to mold the assembly into an integral unit of skin, foam and insert. Previously, it has been practice to mold skin and foam and then to cement the insert in place in a separate operation. The view of FIGURE 2e illustrates use of an expanded metal insert 10i to which the formed skin or covering 10x is cemented prior to the molding operation. A recess or cavity R can be provided as shown in FIGURE 2e so that there is access to an aperture A through which a suitable mounting means such as a screw or bolt can be fitted for attaching the instrument panel assembly in accordance with the present invention relative to a vehicle body. Included as advantages of the structure in accordance with the present invention it is noted that where it is desired to have an insert backing up a skin and foam subassembly, the use of expanded metal makes it possible to completely cement or fasten the skin or covering in place on the insert and subsequently to pour the foam through the expanded metal insert in the correct location anywhere in the dashpad panel or pad assembly. This assembly can then be put into a mold for curing. Also, through the use of an expanded metal insert it is possible to provide an insert shape and to use insert materials which will crush when subjected to specific loads so as to enhance the potential safety value of the instrument panel cover assembly. Also the present invention makes it possible to foam pads with an insert in place where a solid insert would make it impossible to reach and fill certain areas. Yet, it is possible to use an insert for added rigidity in the molded assembly as an aid in handling and shipping. Use of structure in accordance with the present invention effects a reduction in total weight of insert, foam, and skin or covering assembly in view of the practicability of pouring foam material through an expanded metal insert.

Preferably the covering 10x has a non-gloss external surface which can be "predecorated" with a suitable pattern or imitation leather finish as the covering is supplied in sheet form. The plastic sheet is vacuum formed relative to a male mold as outlined in FIGURE 1c. This male mold M is provided with a plurality of passages P through which pressure differential can be effected so as to cause shaping of the sheet to the contour of the dashboard panel desired. Preferably the plastic sheet is clamped by an air tight frame (not shown) relative to the male mold M. A heater is positioned above the sheet until it is uniformly softened in a well-known manner and air is exhausted from the mold area and atmospheric pressure forces the plastic sheet against the contours of the mold M. Reverse air pressure is used to separate a formed part from the mold. Subsequent to vacuum forming, the covering can be cemented into place on an insert 10i without further post-forming after the molding operation. Many plastics are available in sheet form. Plastic sheet material in an extruded form is available and can be used as the covering 10x because plastic material such as cellulose acetate butyrate has good impact resistance and is available in a wide range of opaque colors. Butyrate has very suitable forming characteristics and has a relatively low moisture absorption rate. Extruded acrylic sheet material can also be used for the covering 10x because of ultra-violet resistance. Poly vinyl chloride is a premium material of high strength and durability but available at slightly above average cost. Vinyl copolymer (vinyl chloride-acetate copolymer) is ideal for parts such as a dashboard covering material requiring deep drawing. Vinyl copolymer has a durable color-retaining abrasion resistance surface.

Another suitable sheet material for the covering 10x is acrylonitrile-butadiene-styrene which provides high strength, good corrosion resistance and electrical properties. The acrylonitrile-butadiene-styrene sheet material is available in a range of formulations making possible high dimensional stability at temperatures as low as $-50°$ F. or as high as $230°$ F. It is to be understood that the male mold M illustrated in FIGURE 1c must be provided with vacuum holes or passages P placed strategically in the mold recesses to provide clean pulldown of the sheet.

FIGURES 2b and 2c illustrate structures in accordance with the present invention including the expanded insert means 10i, foam 10f and covering 10x relative to which garnish moldings are incorporated. Local depressions D as shown in FIGURE 2b can be provided for permitting attachment of the dashboard panel assembly from an upper surface by fitting a screw or bolt relative to an opening d relative to a solid structural panel such as a fire wall F. However, the dashboard panel assembly in accordance with the present invention can also be mounted in abutting relation with a garnish molding 10G having a curved portion 10g in contact with an upwardly extending portion 10u of the covering 10x shown in FIGURE 2c.

In accordance with the present invention, FIGURE 2 illustrates another embodiment of a dashboard panel assembly including a plastic sheet material covering 10x and foam material 10f filled into space relative to the covering and an expanded insert means 10i with a partial or complete wiring harness incorporated therein as best seen in FIGURE 2a which is a cross sectional elevational view taken along line II—II of FIGURE 2. A socket means or plug generally indicated by numeral 20 can be press-fitted or suitably fastened to the expanded metal insert 10i into which a suitable opening is formed for receiving the plug 20. A wire 20w can be provided extending outwardly from the plug relative to which a suitable electrical connector can be attached along an exposed surface 20e of the plug. The plug can be provided with metal terminals which are crimped relative to the wire 20w in a well-known manner. Wire such as 20w can be attached individually or as a group of wires of a harness relative to the insert 10i before the foaming operation. The wire can be attached to the insert 10i by means of small loops of wires or clips which are preferably U-shaped and embrace the wire and engage apertures 10a of the expanded metal insert means 10i. It is also possible for wire such as 20w to be fitted through these apertures 10a directly such that the need for separate clips is eliminated. A wire 20v is shown in the right hand portion of FIGURE 2a in a position wherein the wire is fitted relative to an aperture 10a of the insert means 10i. A windshield W is shown at a location adjacent to the covering 10x relative to which no garnish molding is provided. More than one plug or connector such as 20 can be provided in the dashboard assembly as shown in FIGURE 2a. Attachment of wiring and/or a group of wires as a harness relative to the insert before the foaming operation assures adequate wiring in predetermined locations for attachment of the wiring relative to various instrument panel accessories such as panel cigarette lighters, electric clocks, and/or courtesy lamps and panel lighting. Provision of foam material 10f relative to both the insert means 10i and wiring assures elimination of loose wire under the instrument panel cover assembly such that electrical short circuits due to rubbing of wiring relative to each other and/or rattles and squeaks can be avoided. Use of printed circuits such as disclosed in U.S. Patent 2,825,038—Woofter, belonging to the assignee of the present invention, can be realized for effecting instrument panel illumination. A printed circuit assembly such as shown in FIGURE 14 of Patent 2,825,038 can be partially or substantially imbedded in foam material and can be suitably secured to the expanded metal insert means 10i by use of suitable fasteners or clips. The incorporation of plug outlets attaching wires or wiring harnesses to either an instrument culster or trunk outlet can be readily accomplished in accordance with the present invention. Suitable lamp socket and terminal means for use in conjunction with printed circuits are also disclosed in co-pending applications United States Serial Number 717,003, now Patent 2,953,769, issued September 20, 1960, and United States Serial Number 717,004—Woofter, filed February 24, 1958, now Patent 3,001,165, issued September 19, 1958. Suitable sockets and connectors for use in conjunction with printed circuit boards are disclosed in co-pending applications United States Serial Numbers 715,680, now Patent 2,911,610, issued November 3, 1959, and 715,704—Kirk, filed February 17, 1958, now Patent 3,024,436, issued March 6, 1962.

As a further modification of a dashboard panel assembly in accordance with the present invention, FIGURES 3 and 3a illustrate use of multiple density or multiple types of foam in an instrument panel cover assembly. Accordingly, an insert means such as 10i is provided having apertures 10a through which an outer peripheral light density foam material 10F is filled into a location immediately adjacent to the plastic sheet material or covering 10x. An impact foam material 10f having greater rigidity is filled into space intermediate the light density foam material 10F and the insert means 10i. FIGURE 3a illustrates closure of space by end portion 10e of covering 10x in conjunction with the bent over or double folded portion 10d of the insert means 10i. The light density foam material 10F forms an outer layer of foam which is compounded to provide a soft resilient feel and the underlayer of impact foam material 10f is compound to provide optimum shock absorbing qualities through the use of low resilient foam material.

It is apparent that a dashboard panel assembly in accordance with the present invention is such that the dashboard can collapse under impact of the human body so as not to injure a passenger. The insert means 10i provides sufficient rigidity for support of electrical accessories such as a radio and clock which can be made in the form of plug-in units so as to be assembled and disassembled from the dashboard. In effect the dashboard assembly in accordance with the present invention provides a substantially non-metallic dash panel constructed from a material which is sufficiently strong to be self-supporting and also strong enough to mount such accessories and electrical structures as an instrument cluster, cigarette lighter, glove box, radio, clock, etc., and yet is not a conductor of electricity and also is reasonably soft and crushable. The dashboard panel assembly is capable of collapsing on severe impact without causing undue forces on the human body or breaking in such a way that puncture wounds could be secured. Both rigid and semi-rigid isocyanate foam materials can be filled relative to the expanded insert means 10i and either a wiring harness or printed circuit wiring means individually or in combination can be incorporated in the dashboard panel itself for establishing electrical connection. Such electrical connection relative to a dashboard panel permit prestesting and facilitate installation of a complete dashboard panel assembly with wiring and electrical connections in place relative to a vehicle body. The dashboard panel assembly in accordance with the present invention provides freedom from wire chafing and resultant electrical fires. The present invention also provides freedom from hard to find rattles. Overall cost of the dashboard panel structure is reduced and there is provided a greatly simplified instrument mounting and connection relative to electrical circuits. Also, the foam material provided relative to the expanded insert provides shock mountings for instruments heretofore not obtainable.

The expanded metal insert means 10i is particularly useful with polyisocyanate foam materials which are not flowable as are latex foams. The polyisocyanate material can be filled only partly into space relative to the insert and covering material 10x and due to the apertures 10a can foam and rise evenly because the apertures permit release of gasses which would be trapped relative to a solid insert. The foam material can be filled into a cavity such that at least one side of the insert means 10i is in immediate contact therewith as shown in FIGURE 3 or the foam material can be filled into a cavity such that the insert means 10i is fully imbedded in the foam material as shown in FIGURES 1a and 1b for example. Wiring including plugs or prongs can be provided as shown in FIGURES 1b and 2a. Jack-type plugs 30 attached to wires 30w can be provided in FIGURE 1b and a U-shaped clip means 30c can be used to hold wire such as 30w in place as shown in FIGURE 1b.

While the embodiments of the present invention as herein disclosed constitute preferred forms it is to be understood that other forms might be adopted.

What is claimed is as follows:

1. A collapsible instrument-mounted panel structure per se to complement and be secured to a vehicle body interiorly thereof, comprising, a non-metallic covering of sheet material having a contoured shape including a shelf portion and a laterally projecting curved cushion portion, an insert means which per se is structurally to be supported directly as to the vehicle body though necessarily adapted to be readily deformed when subjected to a predetermined load, and a foam material provided on opposite sides of said insert means so as to fill completely at least space in between said covering and said insert means which also provides instrument device support directly free of any solid continuous sheet metal so as to permit collapse of the contoured shape curved cushion in case of accident impact.

2. A collapsible instrument-panel vehicle-mounted combination assembly per se, comprising, a non-metallic covering of sheet material having an outer decorative surface to complement vehicle cowl contour, an impact absorbing foam material provided along an inner surface of said covering, and an insert means of expanded metal alone provided in a predetermined location relative to said covering as well as foam material, solely secured to the body front end by said expanded metal insert means having apertures therethrough to facilitate formation of said foam material uniformly to fill space in between said covering and said insert means for deformation and collapse thereof per se as the assembly and completely free of any solid metal as backing therewith.

3. A collapsible instrument-panel vehicle-mounted assembly per se, comprising, a non-metallic covering of sheet material having an outer decorative surface, an impact absorbing foam provided along an inner surface of said covering, and an insert means of expanded metal alone provided in a predetermined location relative to said covering and foam and having apertures through which foam is filled into space in between said covering and said insert means for deformation and collapse thereof per se as the assembly and completely free of any solid metal as backing therewith, said foam including a layer of high resilience and light density material immediately adjacent to said covering and a centrally located layer of impact absorbing material.

4. A method of forming a non-metallic instrument-mounting panel for vehicles, comprising the steps of, vacuum-forming a heated sheet of plastic material into a predetermined shape, utilizing the sheet of material as a skin fastened in place relative to an insert perforated to permit flow of resilient foam material on opposite sides of the insert, and providing a mounting flange formed completely to shape along joined edges of the insert and skin for mounting relative to a vehicle body with and without garnish molding trim means.

5. A vehicle body instrument-mounting panel per se structure, comprising, only an expanded metal insert means rather than any rigidly solid metal that would be substantially undeformable, a covering of plastic sheet material joined along edges to said insert means and having a platform portion as well as a curved cushion portion spaced a predetermined distance from said insert means, and a foam material that fills space relative to one side of said covering and that coalesces surrounding said insert means as a uniform filling for space in between said covering and said insert means, said foam material, covering, said expanded metal insert means being summarily collapsible and displaceable though shielded by covering and said foam material under body force free of possible bone-breaking as well as skin rupturing effect such as due to solid metal upon accidental body impact during collisions and the like.

6. The structure of claim 5 in which said foam material is polyurethane which lacks flowability while formation thereof is enhanced particularly with said expanded metal insert means to permit release of gases due to foam formation which would otherwise be trapped in irregular configurations.

7. In an instrument-mounting panel structure per se to include a non-metallic covering of sheet material having a contoured shape including a shelf portion and a laterally projecting curved cushion portion substantially complementary to a vehicle body front end interior, the improvement which comprises having only an insert means with a plurality of perforations therethrough and a foam material to fill space during formation thereof enhanced by the perforations in the insert means at a predetermined distance to one side of the covering for deformation and collapse thereof per se and completely free of any solid metal as backing therewith, said insert means along with said foam material and covering being structurally secured directly to the vehicle body front end interior.

References Cited in the file of this patent

UNITED STATES PATENTS

| | | |
|---|---|---|
| 2,070,760 | Straith | Feb. 16, 1937 |
| 2,560,009 | Straith | July 10, 1951 |
| 2,626,163 | Scantlebury | Jan. 20, 1953 |
| 2,653,139 | Sterling | Sept. 22, 1953 |
| 2,744,042 | Pace | May 1, 1956 |
| 2,818,933 | Tell | Jan. 7, 1958 |
| 2,938,737 | Walker | May 31, 1960 |
| 2,989,112 | Sonnleitner | June 20, 1961 |

FOREIGN PATENTS

| | | |
|---|---|---|
| 1,158,086 | France | Jan. 13, 1958 |
| 67,819 | France | Mar. 24, 1958 |

(First addition to No. 1,115,317)